US006556227B1

United States Patent
Gantt

(10) Patent No.: US 6,556,227 B1
(45) Date of Patent: Apr. 29, 2003

(54) VISUALIZATION TECHNIQUES FOR CONSTRUCTIVE SYSTEMS IN A COMPUTER-IMPLEMENTED GRAPHICS SYSTEM

(75) Inventor: Brian D. Gantt, Driftwood, TX (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/527,078

(22) Filed: Mar. 16, 2000

(51) Int. Cl.[7] ............................................... G06F 15/00
(52) U.S. Cl. ....................................... 345/851; 345/805
(58) Field of Search ................................. 345/850–851, 345/852, 805, 782, 783, 765, 664–665, 420, 419, 433, 804, 785–781; 382/285

(56) References Cited

U.S. PATENT DOCUMENTS 5,255,352 A * 10/1993 Falk ........................... 345/782
6,005,579 A * 12/1999 Sugiyama et al. .......... 345/782
6,295,069 B1 * 9/2001 Shirur ......................... 345/420
6,304,259 B1 * 10/2001 DeStefano ................... 345/850
6,434,277 B1 * 8/2002 Yamada et al. ............. 382/285

* cited by examiner

Primary Examiner—Steven Sax
(74) Attorney, Agent, or Firm—Gates & Cooper LLP

(57) ABSTRACT

A computer-implemented graphics system provides visual cues for navigating a three-dimensional space. A two-dimensional viewport of the three-dimensional space is displayed on a monitor attached to the computer, and an object is moved through the two-dimensional viewport of the three-dimensional space according to a position of the input device attached to the computer. A graphical image of the object is created using constructive geometric data stored therein, wherein the constructive geometric data identifies at least one constructive system, and the constructive system identifies at least one constraint on the processing of the object. The graphics system determines a position of the object within the three-dimensional space relative to the two-dimensional viewport, and generates one or more visual cues to indicate the position.

21 Claims, 9 Drawing Sheets

VISUALIZATION TECHNIQUES FOR CONSTRUCTIVE SYSTEMS IN A COMPUTER-IMPLEMENTED GRAPHICS SYSTEM

CROSS-REFERENCE TO RELATED APPLICATIONS

This application is related to the following co-pending and commonly-assigned patent applications, all of which applications are incorporated by reference herein:

Application Ser. No. 09/388,799, filed on Sep. 2, 1999, by Robert E. Bou and Brian D. Gantt, entitled"CONSTRUCTIVE SYSTEMS FOR OBJECTS IN A COMPUTER-IMPLEMENTED GRAPHICS SYSTEM";

Application Ser. No. 09/464,557, filed on Dec. 16, 1999, by Brian D. Gantt, entitled "VISUAL CUES TO NAVIGATE THREE-DIMENSIONAL SPACE IN A COMPUTER-IMPLEMENTED GRAPHICS SYSTEM";

Application Ser. No. 09/419,539, filed on Oct. 18, 1999, by Brian D. Gantt, entitled "METHOD AND SYSTEM FOR INTERACTIVELY DETERMINING AND DISPLAYING GEOMETRIC RELATIONSHIPS BETWEEN THREE DIMENSIONAL OBJECTS BASED ON PREDETERMINED GEOMETRIC CONSTRAINTS AND POSITION OF AN INPUT DEVICE";

Application Ser. No. 09/088,116, filed Jun. 1, 1998, by Lawrence D. Felser et al., entitled "POSITIONING AND ALIGNMENT AIDS FOR SHAPE OBJECTS HAVING AUTHORABLE BEHAVIORS AND APPEARANCES";

Application Ser. No. 09/256,896, filed on Feb. 24, 1999, by Alexander Thoemmes et al., entitled "ACQUIRING AND UNACQUIRING ALIGNMENT AND EXTENSION POINTS"; and Application Ser. No. 09/265,021, filed on Mar. 9, 1999, by Robert E. Bou, entitled "AFFINITIVE PLACEMENT BY PROXIMITY IN A COMPUTER-IMPLEMENTED GRAPHICS SYSTEMS".

BACKGROUND OF THE INVENTION

1. Field of the Invention

The present invention relates generally to computer-implemented graphics systems, and in particular, to a method, apparatus, and article of manufacture for providing visualization techniques for constructive systems for objects in a computer-implemented graphics system.

2. Description of the Related Art

The use of computer-implemented graphics programs is well known in the art. In typical graphics programs, such as AutoCAD™, there are generally two geometric grids for assisting users in constructing or placing elements. These are static regular Cartesian or Polar projection grids, based either on a world origin or a local reference origin, or in advanced systems automatically inferred from a relative object point of interest or element constructive base point. Additional assistant geometries may be provided as extensions and relationships between elements.

However, users also need assistant temporary geometries that are constructive in nature, i.e., that reflect a "constructive system". Constructive systems are important in the real world, especially for manufactured assemblies. For example, a stack of bricks is a simple three-dimensional (3D) constructive system, wherein the stack usually includes constraints on the size of individual bricks, as well as longitudinal constraints regarding the placement and assembly of individual bricks into the stack. Alternatively, an arch comprised of bricks may be a complex 3D constructive system, wherein the arch includes constraints on the size of individual bricks, 3D placement of the bricks, attachment of the bricks, etc. The issues become even more complex when dealing with other complex assemblies of objects.

Another problem arises, however, in that such 3D constructive systems use a two-dimensional (2D) graphical user interface (GUI) to display graphical images, such as 2D or 3D models, schematic diagrams, photorealistic images, etc. When a 3D space is displayed in a 2D GUI, the operator is responsible for perceiving the third dimension, and is often aided by perspective views, rendering, shadows or other visual cues provided by the graphics systems.

Consequently, there is a need in the art for improved techniques for providing visual cues in computer-implemented graphics systems to navigate objects constrained by constructive systems through a 3D world space using only a 2D viewport. Specifically, there is a need in the art for improved visualization techniques for constructive systems in computer-implemented graphics systems.

SUMMARY OF THE INVENTION

To address the requirements described above, the present invention discloses a method, apparatus, and article of manufacture for providing visual cues for navigating a three-dimensional space. A two-dimensional viewport of the three-dimensional space is displayed on a monitor attached to the computer, and an object is moved through the two-dimensional viewport of the three-dimensional space according to a position of the input device attached to the computer. A graphical image of the object is created using constructive geometric data stored therein, wherein the constructive geometric data identifies at least one constructive system, and the constructive system identifies at least one constraint on the processing of the object. The graphics system determines a position of the object within the three-dimensional space relative to the two-dimensional viewport, and generates one or more visual cues to indicate the position.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-implemented graphics system that provides improved visualization techniques for three-dimensional (3D) constructive systems. Generally, the present invention is comprised of two parts.

First, constructive geometric data is stored for each object, wherein the constructive geometric data defines a constructive system This data is stored as part of an object definition, by means of one or more indices to a table of constructive systems, wherein each of the constructive systems comprises the constructive geometric data. The constructive geometric data can accommodate any number of different formats or data types, including regular and irregular systems, interpreted formulae, replacement systems, references to substitute objects, etc.

Second, all commands for display, placement, modification, or creation of objects interpret the associated constructive systems for objects being displayed, placed, modified, or created, and for other objects that have been nominated or are proximate to the object of interest. The interpretation of the constructive systems then creates solution sets of points, alignments, relationships, or substitutions to which the active object is constrained.

The current process of "designing for construction" is error prone and difficult to visualize while in the CAD environment. The process of the present invention, in contrast, provides a user with a variety of correct construction geometry based upon the underlying objects used in the construction process.

Hardware and Software Environment

Figure 1:
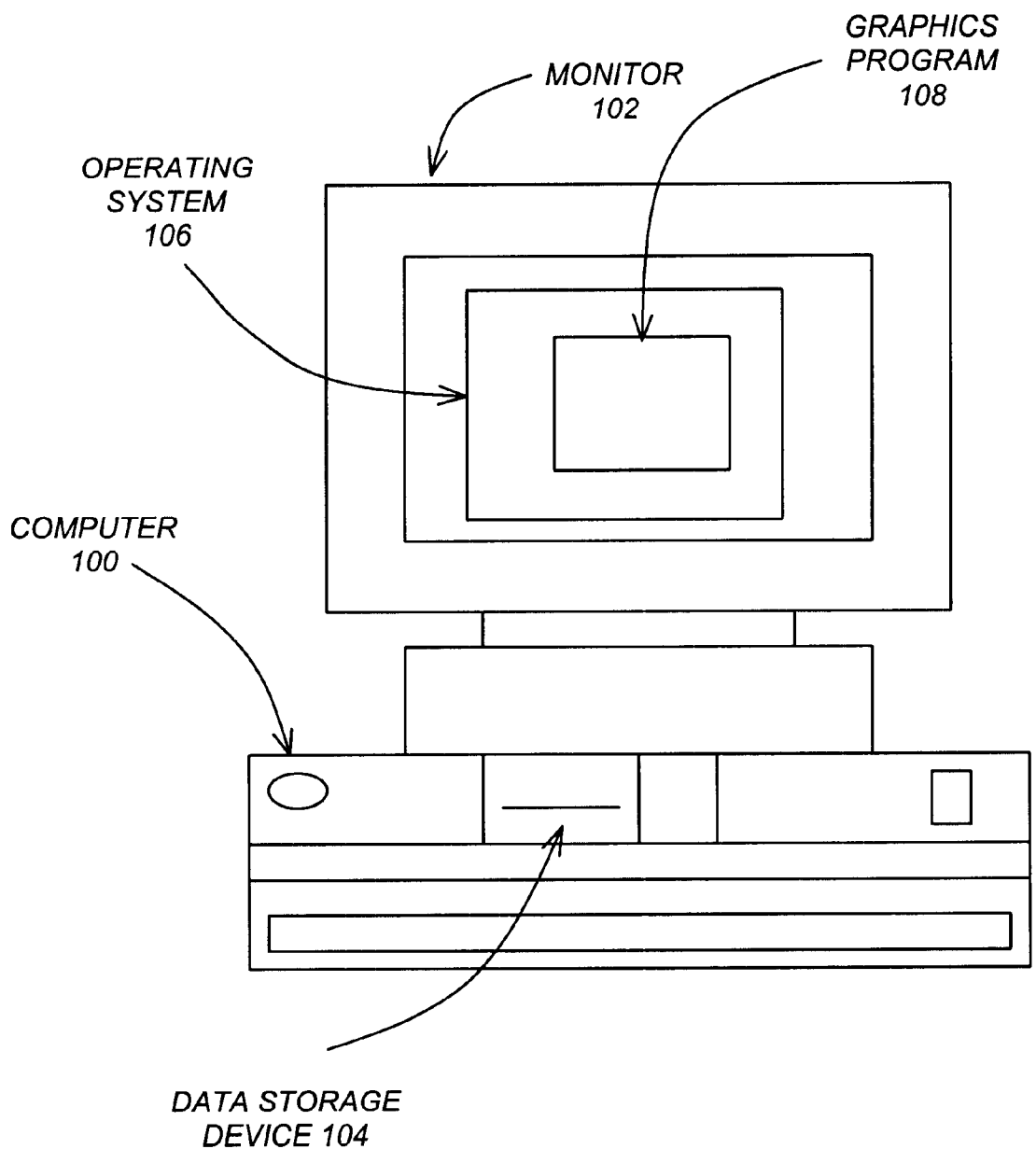
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108 that operates under the control of the operating system 106, wherein the graphics program 108 also is represented by a window displayed on the monitor 102.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via a data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-implemented Graphics Program

Figure 2:
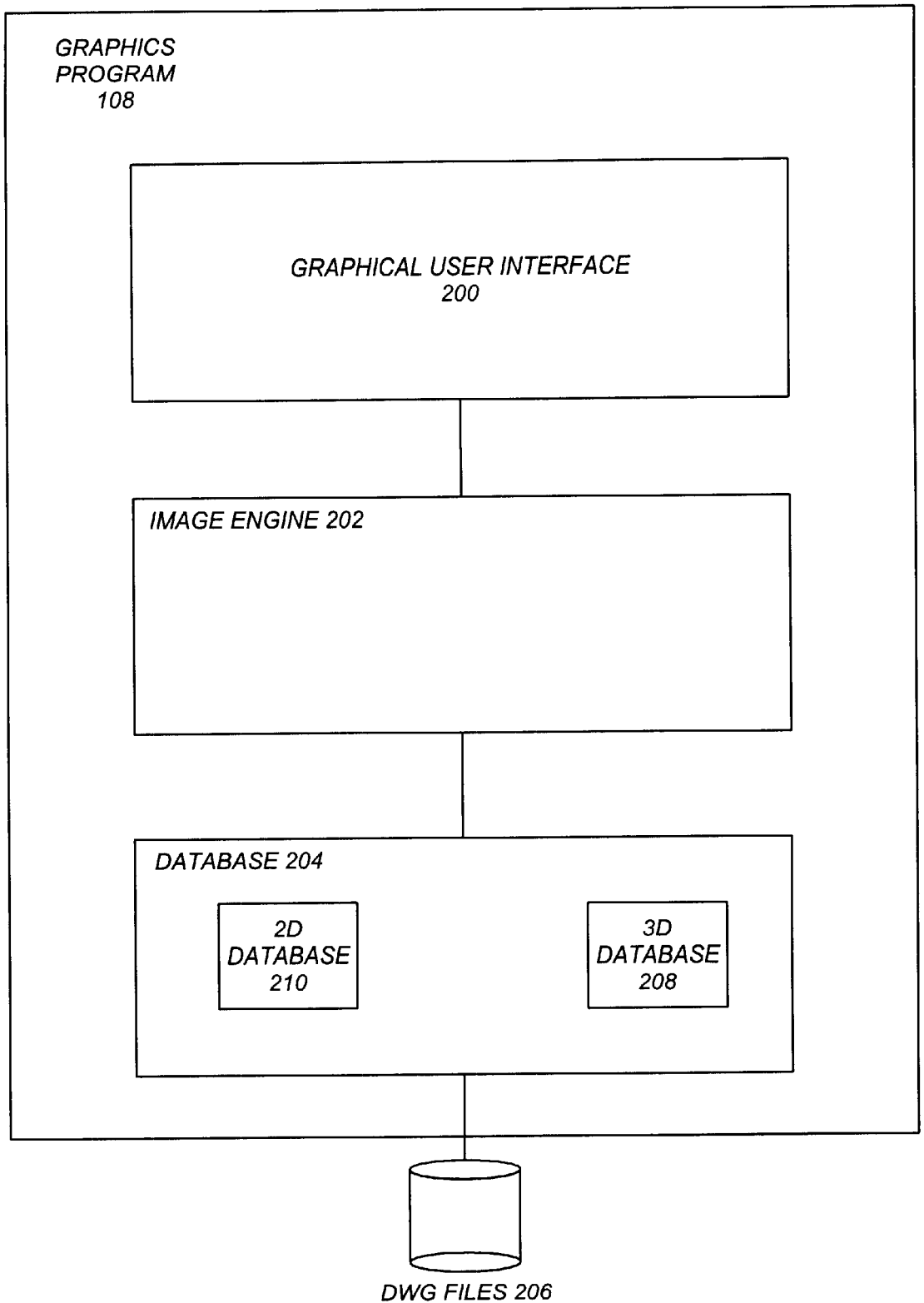
FIG. 2 is a block diagram that illustrates the components of the graphics program according to the preferred embodiment of the present invention.

FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202, and a DataBase (DB) 204 for storing objects in Drawing (DWG) files 206.

The Graphical User Interface 200 displays information to the user and provides the functionality for the user's interaction with the graphics program 108.

The Image Engine 202 processes the DWG files 206 and delivers the resulting graphics to the monitor 110 for display. In the preferred embodiment, the Image Engine 202 provides a complete application programming interface (API) that allows other computer programs to interface to the graphics program 108 as needed.

The Database 204 is comprised of two separate types of databases: (1) a 3D database 208 known as a "world space" that stores 3D information; and (2) one or more 2D databases 210 known as "virtual spaces" or "view ports" that store 2D information derived from the 3D database 208.

Object List

Figure 3:
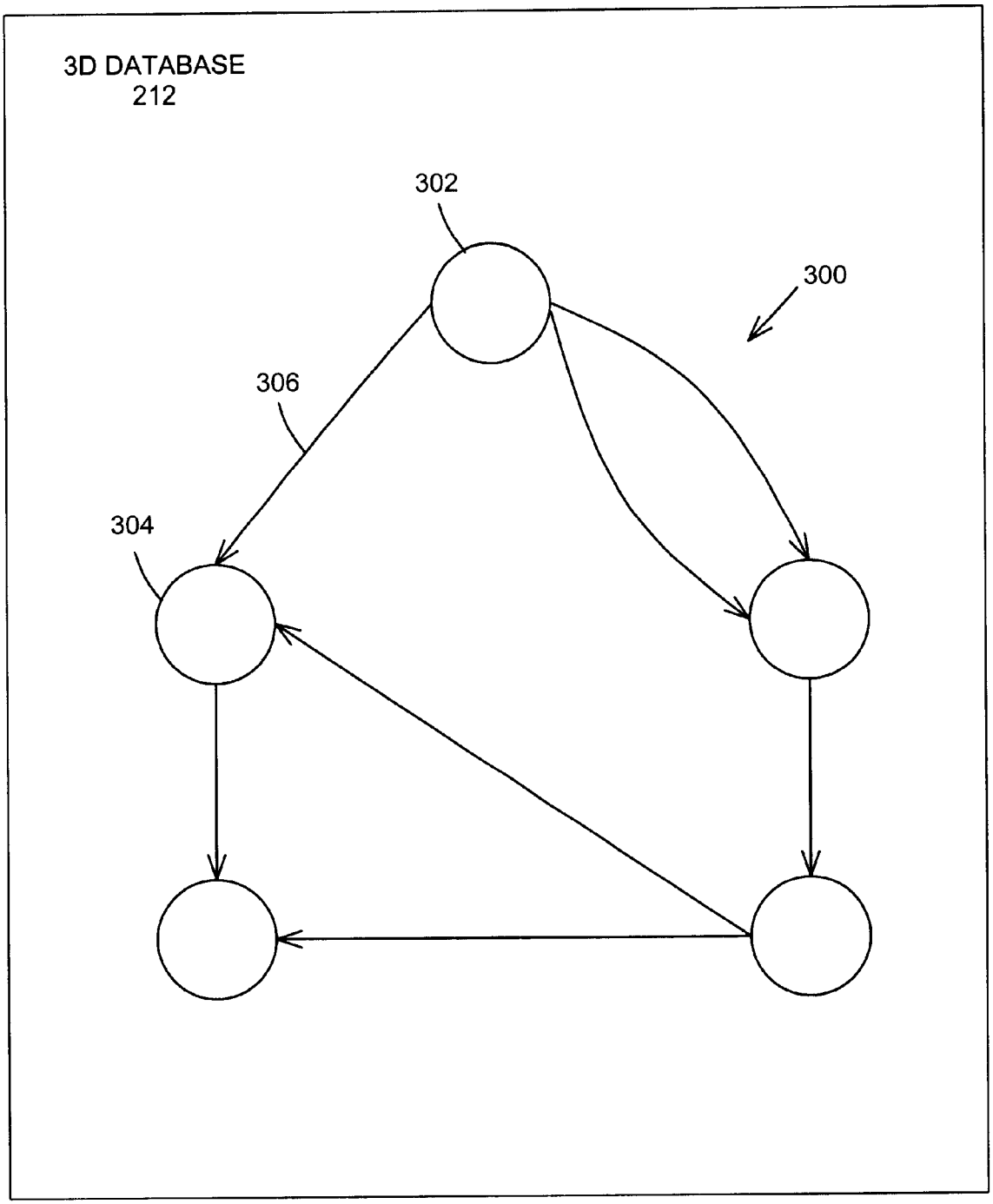
FIG. 3 is a block diagram that illustrates the structure of an object list maintained by the 3D databases according to the preferred embodiment of the present invention.

FIG. 3 is a block diagram that illustrates the structure of an object list 300 maintained by the 3D databases 208 according to the preferred embodiment of the present invention. The object list 300 is usually comprised of a doubly linked list having a list head 302 and one or more objects 304 interconnected by edges 306, although other structures may be used as well. There may be any number of different object lists 300 maintained by the 3D databases 208. Moreover, an object 304 may be a member of multiple object lists 300 in the 3D databases 208.

Object

Figure 4:
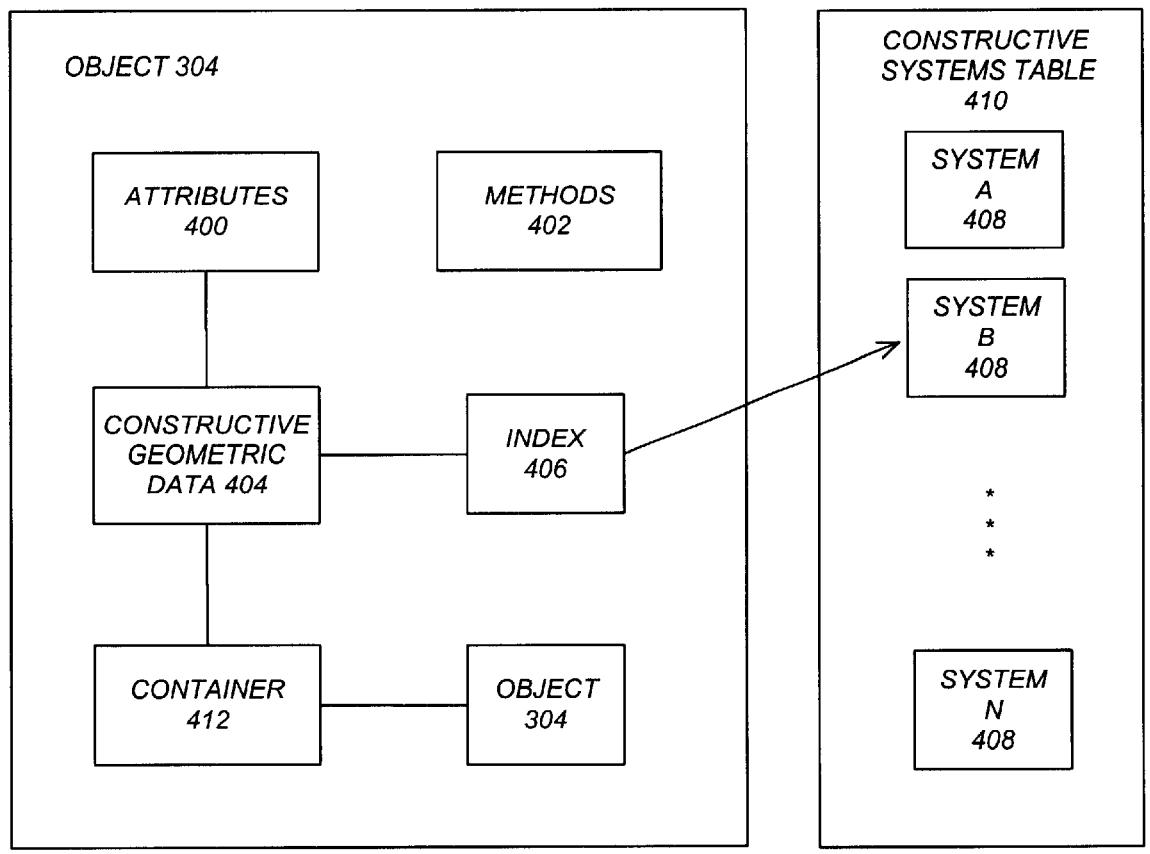
FIG. 4 is a block diagram that illustrates the components of an object according to the preferred embodiment of the present invention.

FIG. 4 is a block diagram that illustrates the components of an object 304 according to the preferred embodiment of the present invention. The object 304 is generally comprised of a number of different elements: (1) attributes 400 that store data for a particular object 304; and (2) methods 402 (both public and private) that embody the functions provided by the object 304.

The attributes 400 include constructive geometric data 404 including one or more indices 406 that point to the entries 408 of a table 410 of constructive systems, wherein the constructive systems 408 define the underlying geometric structures for the object 304. The attributes 400 also include a container 412 for embodying links to zero or more subordinate objects 304.

Each of the constructive systems 408 store data related to various options concerning the geometric elements, resizing, placement, attachment, assembly, etc., attributes of objects 304 deemed within the constructive system 408 by means of their indices 406. Generally, each of the constructive systems 408 determines the correct placement of objects 304 near to or relative to other objects 304, and also in resizing the objects 304. The constructive systems 408 also accommodate both regular and irregular geometries, interpreted formula, replacement objects 304, etc. Multiple options are usually accommodated for each object 304.

All functions within the graphics program 108 that relate to the placement, modification, creation, etc., of objects 304 must interpret these constructive systems 408 for objects 304 being placed, modified, created, etc., for objects 304 that have been nominated or are proximate to an area of interest, for objects 304 proximate to other objects 304 being placed, modified, created, etc., or for other situations. The interpretation of the constructive systems 408 by the graphics program 108 results in the creation of solution sets of points, alignments, relationships, substitutions, etc., to which the object 304 (including cursor position) is constrained.

In the preferred embodiment, the constructive system 408 associated with the object 304 assists the user in positioning the objects 304 relative to one another. The constructive system 408 also constrains the orientation, direction, and other properties of the object 304 that allow for directed interaction between objects 304 within a document. Finally, the constructive system 408 uses visualization techniques to assist the operator in determining the location of an object 304 as it is being manipulated in accordance with the constructive system 408.

Visualization Techniques

An operator is responsible for indicating the position of an object 304 added to a design. The position of the object 304 is constrained by the constructive system 408, but the exact position is difficult for an operator to determine on a 2D viewport 210, leading to uncertainty on the part of the operator as to the exact position of the object 304.

The graphics program 108 includes functions for assisting the operator in ascertaining the position of the object 304 within a 3D world space 208 using a 2D viewport 210. In the preferred embodiment, these functions employ human recognizable metaphors as visual cues in order to provide an extra dimension of visual feedback to the operator navigating the object 304 through the 3D world space 208 using the 2D viewport 210. The visual cues are computed from the constraints defined in the constructive system 408.

In the preferred embodiment, these cues are temporary and change in appearance as the object 304 is moved within the 3D world space 208. Specifically, in the preferred embodiment, the visual cues comprise a trail of indicators showing prior positions of the object 304 within the 3D world space 208 relative to the 2D viewport 210. These indicators, in the preferred embodiment, comprise altered outlines of the object 304.

The visual cues can be combined with specific mouse 106 motions or other cursor control sequences to provide navigable points of interest that are readily perceived by the operator. The present invention thus simplifies the process of the operator learning how to navigate the object 304 through the 3D world space 208 that is displayed in the 2D viewport 210. As a result, the present invention enhances the utility of 3D modeling by allowing a wider audience to master heretofore complex techniques for navigating objects 304 in a 3D world space 208.

Examples

Figure 5:
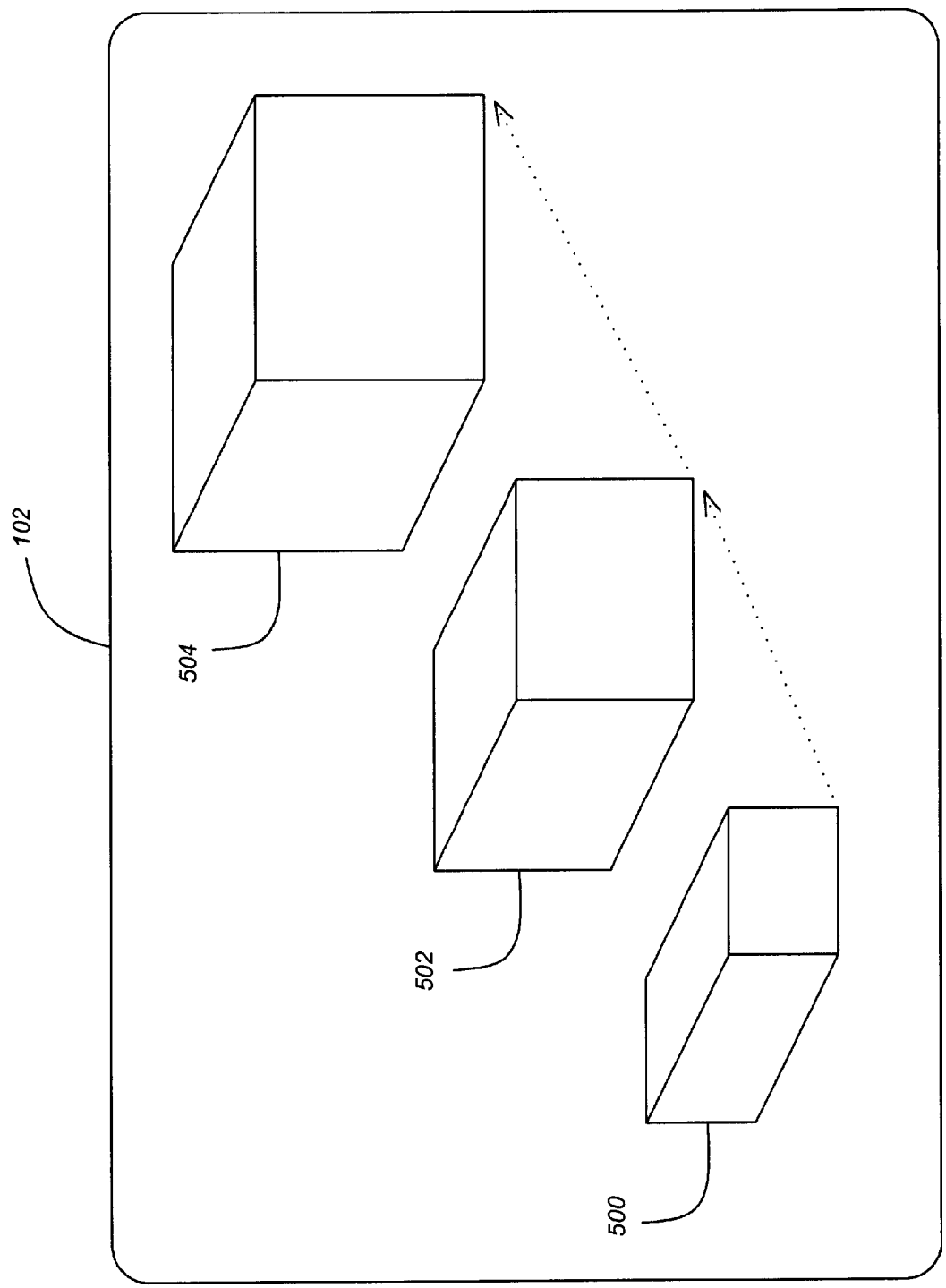
FIGS. 5 and 6 illustrate example viewports displaying one or more objects on a monitor according to the preferred embodiment of the present invention.
Figure 6:
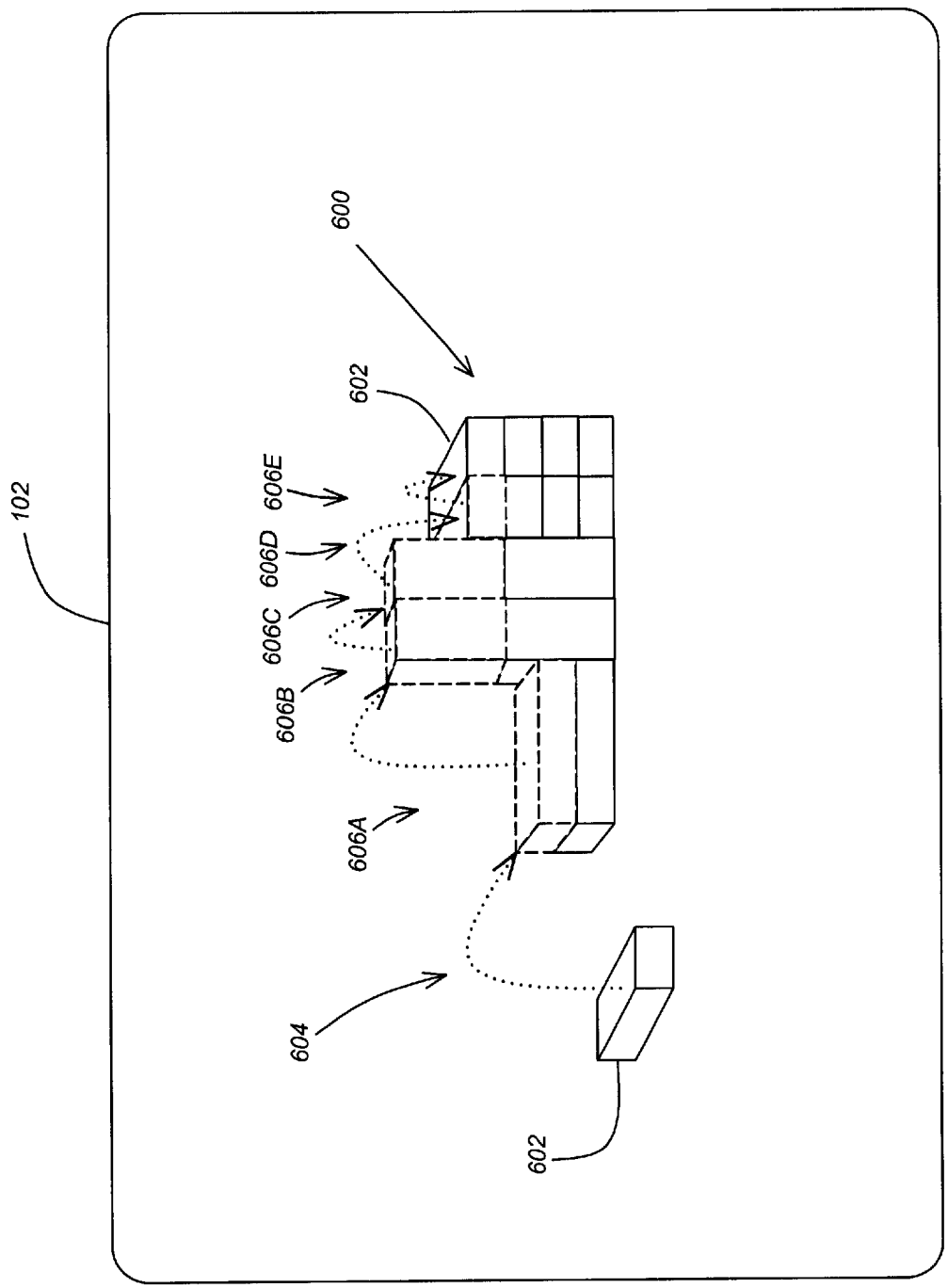

FIGS. 5 and 6 illustrate example viewports displaying one or more objects 304 on a monitor 102 according to the preferred embodiment of the present invention. In this example, the object 304 describes a brick, which includes a number of attributes such as the geometry of a brick, as well as materials, textures, etc., of the brick As shown in FIG. 5, the object 304 may be constrained to a limited number of sizes, any of which may be invoked by resizing the object 304 using handles. The object 304 "snaps" to a limited number of different sizes, based on the constructive geometric data 404. In this example, the object 304 comprises a brick, which is constrained to three different sizes 500, 502, and 504 according to its constructive system 408.

As shown in FIG. 6, the object 304 maybe constrained by the constructive geometric data 404 to only attach or place itself only in conjunction with other similar objects 304, which may be invoked by dragging the object 304 through one or more "snap points". In this example, a collection of bricks 600 has been assembled together in various orientations. As another brick 602 is dragged within proximity of the collection 602, the graphics program 108 automatically positions the dragged brick 602 in relation to the collection 600 according to its constructive system 408, so that the dragged brick 602 connects to another brick within the collection 600 properly.

In the example of FIG. 6, the orientation of the dragged brick 602 is shown by the dashed outlines comprising the dragged brick 602 located at snap points 604A, 604B, 604C, 604D, and 604E, and the path of the dragged brick 602 is shown by the dotted arrows between 604A, 604B, 604C, 604D, and 604E. No rotation or flip tools are required, since the graphics program 108 uses the constructive system 408 to determine how to automatically rotate and/or flip the brick 602 to fit properly with adjoining bricks of the collection 600. This makes assembly of objects 304 simpler and less time consuming.

According to the preferred embodiment, the present invention leaves "trail" comprised of the dashed outlines of the dragged brick 602 through the snap points 604A, 604B, 604C, 604D, and 604E, and/or the dotted arrows between 604A, 604B, 604C, 604D, 604E. This trail comprises one of the possible visualization techniques of the present invention.

Logic of the Graphics Program

Figure 7:
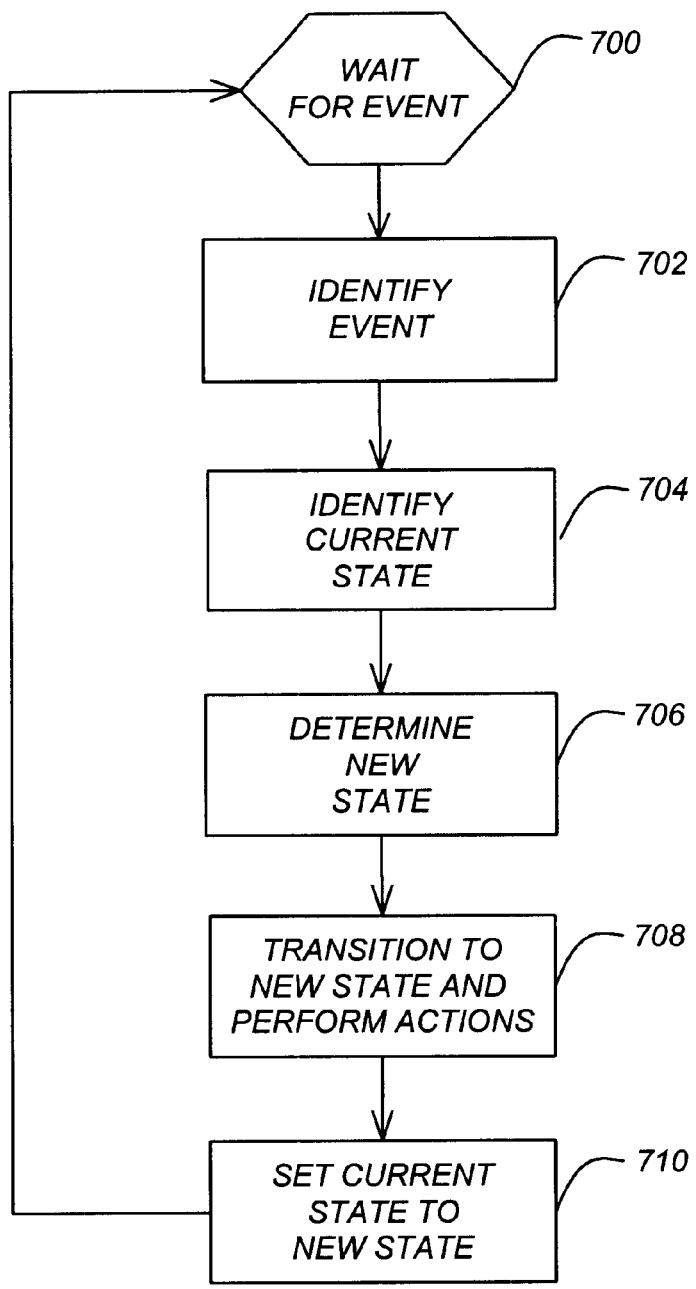
FIGS. 7, 8, and 9 are flowcharts that illustrates the logic of the preferred embodiment of the present invention.
Figure 8:
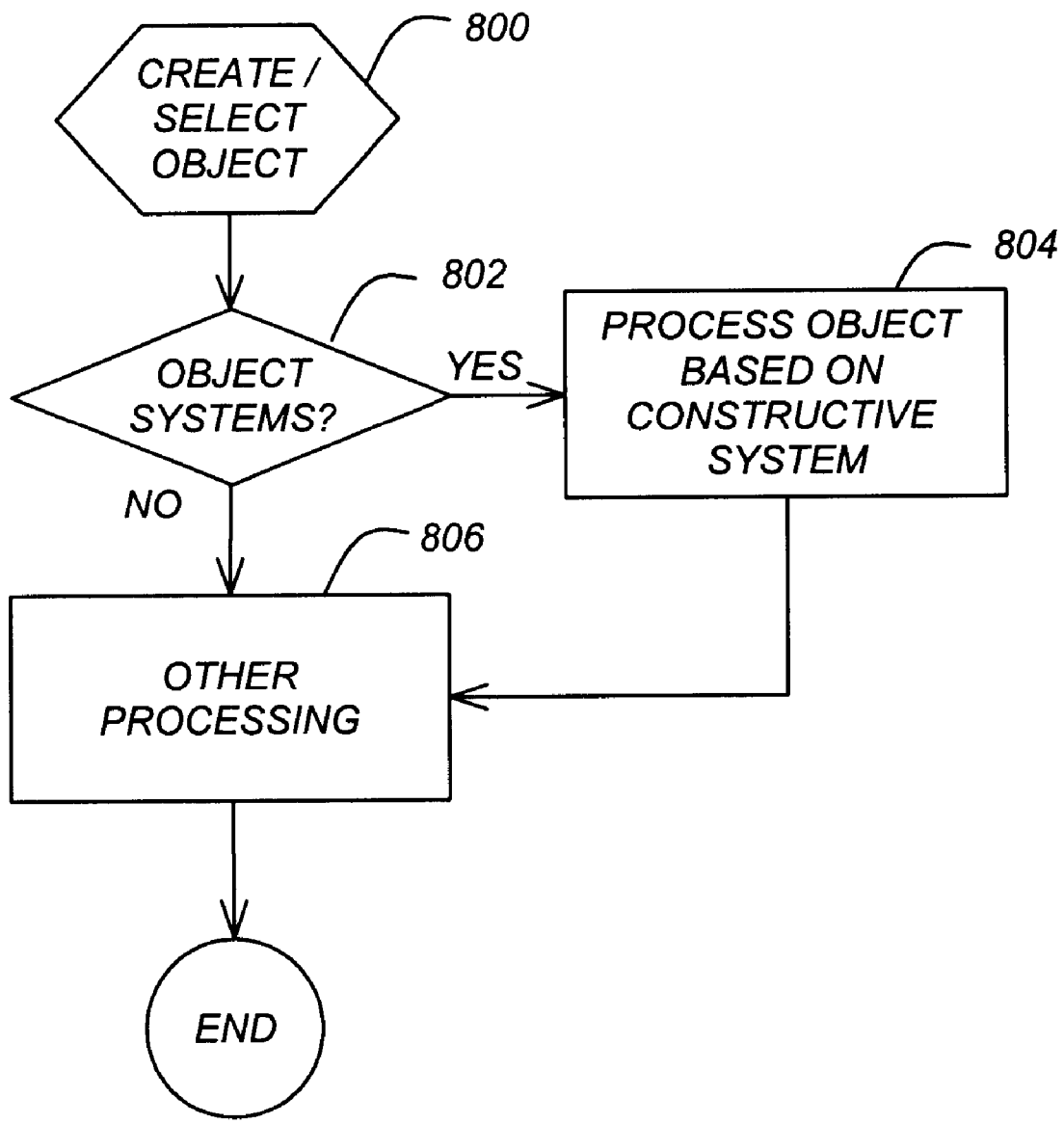
Figure 9:
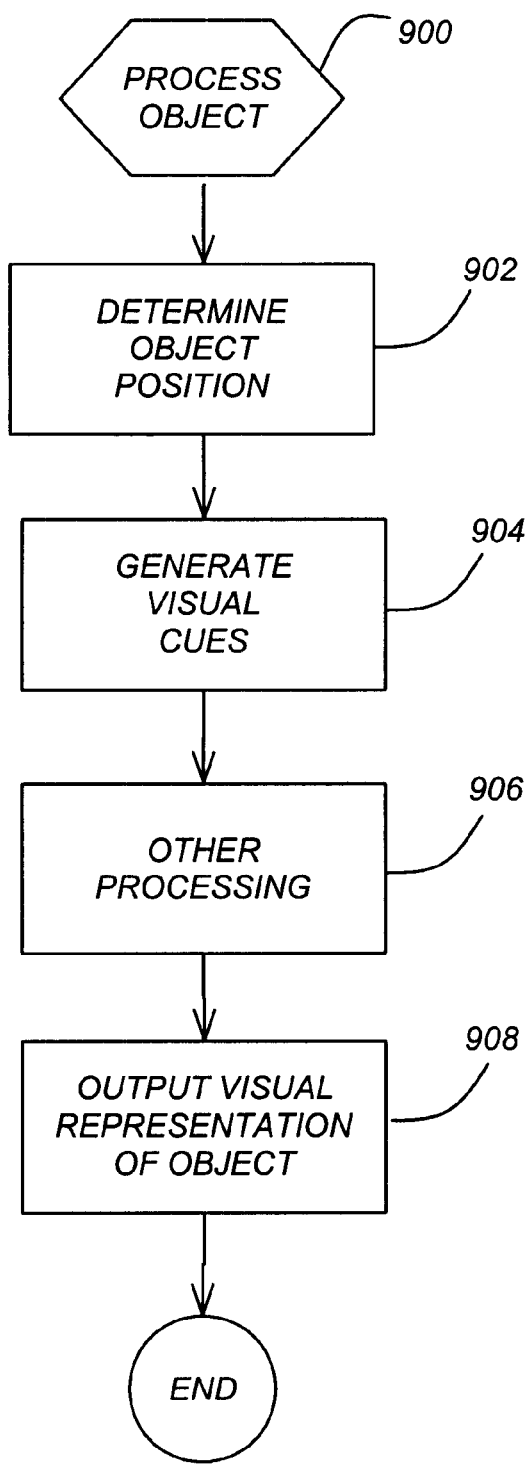

Flowcharts which illustrate the logic of the graphics program 108 according to the preferred embodiment of the present invention are shown in FIGS. 7, 8 and 9. Those skilled in the art will recognize that this logic is provided for illustrative purposes only and that different logic may be used to accomplish the same results.

FIG. 7 is a flowchart that illustrates the general logic of a message or event-driven graphics program 108 performing the steps of the preferred embodiment of the present invention. In such a graphics program 108, operations are performed when transitions are made, based upon the receipt of messages or events, from present or current states to new states.

Generally, the flowchart begins by waiting at Block 700 for an event (e.g., a mouse button click). It should be appreciated that, during this time, other operating system 116 tasks, e.g., file, memory, and video tasks, etc., may also be carried out. When an event occurs, control passes to Block 702 to identify the event. Based upon the event, as well as the current state of the graphics program 108 determined in Block 704, a new state is determined in Block 706. In Block 708, the logic transitions to the new state and performs any actions required for the transition. In Block 710, the current state is set to the previously determined new state, and control returns to Block 700 to wait for more input events.

The specific operations that are performed by Block 708 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 100.

FIG. 8 is a flowchart that illustrates the general logic that is performed according to the preferred embodiment of the present invention.

The logic begins at Block 800 when an object 304 is created by a user by means of a menu function item, or by being dragged from a toolbar, or by some other manner, and then being displayed in a viewport 210 on the monitor 102. Alternatively, Block 800 can represent a user selecting an object 304 already displayed within the viewport 210 on the monitor 102.

Block 802 is a decision block that represents the application program 108 determining whether there are constructive systems 408 associated with the selected object 304. If so, control transfers to Block 804; otherwise, control transfers to Block 806.

Block 804 represents the graphics program 108 processing the object 304 to create the graphical image, wherein either the selected object 304 or an object 304 in proximity to the selected object 304 includes constructive geometric data 406 stored therein, the constructive geometric data 406 identifying at least one constructive system 408, and the constructive system 408 identifying at least one constraint on the processing of the objects 304 by the image engine 202.

Block 806 represents the graphics program 108 performing other processing on the objects 304.

Block 808 represents the graphics program 108 delivering the graphical image to an output device, such as a monitor 102, coupled to the computer 100.

FIG. 9 is a flowchart that illustrates the general logic that is performed in Block 804 according to the preferred embodiment of the present invention.

The logic begins at Block 900 when the graphics program 108 processes the object 304 to create the graphical image, according to the constructive geometric data 406 of the object 304.

Block 902 represents the graphics program 108 determining the position of the object 304 within the 3D world space 208 relative to the 2D viewport 210.

Block 904 represents the graphics program 108 generating one or more human recognizable metaphors, i.e., visual cues, for the object 304, in accordance with the constructive system 408, in order to provide an extra dimension of visual feedback to the operator navigating the object 304 through the 2D viewport 210 of the 3D world space 208.

Block 906 represents the graphics program 108 performing other processing on the object 304.

Block 908 represents the graphics program 108 delivering the graphical image to an output device, such as a monitor 102, coupled to the computer 100.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or operating system providing graphical functions could benefit from the present invention.

In summary, the present invention discloses a method, apparatus, and article of manufacture for using constructive systems in a computer-implemented graphics system One or more objects stored in a database are processed to create a graphical image and the graphical image is then delivered to an output device. Each of the objects includes constructive geometric data stored therein. The constructive geometric data identifies at least one constructive system, and the constructive system identifies at least one constraint on the processing of the objects by the image engine.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for providing visual cues for navigating a three-dimensional space represented in a computer-implemented graphics system, comprising:

(a) displaying a two-dimensional viewport of the three-dimensional space on a monitor attached to the computer;

(b) moving an object through the two-dimensional viewport of the three-dimensional space according to a position of the input device attached to the computer;

(c) creating a graphical image of the object using constructive geometric data stored therein, wherein the constructive geometric data identifies at least one constructive system, and the constructive system identifies at least one constraint on the processing of the object;

(d) determining a position of the object within the three-dimensional space relative to the two-dimensional viewport; and (e) generating one or more visual cues to indicate the position of the object within the three-dimensional space relative to the two-dimensional viewport, wherein the visual cues are temporary and change in appearance as the object is moved within the three-dimensional space.

2. The method of claim 1, wherein the visual cues comprise a trail of indicators showing prior positions of the object within the three-dimensional space relative to the two-dimensional viewport.

3. The method of claim 2, wherein the indicators comprise altered outlines of the object.

4. The method of claim 1, wherein the constructive geometric data identifies a plurality of the constructive systems, and the constructive systems identify a plurality of the constraints on the processing of the object.

5. The method of claim 4, wherein the constructive system are each comprised of attributes and methods.

6. The method of claim 4, wherein the constructive systems constrain how the objects interact with other objects.

7. The method of claim 6, wherein the constructive systems determine a correct placement of a first object relative to a second object.

8. A computer-implemented graphics system for providing visual cues for navigating a three-dimensional space represented therein, comprising:

(a) a computer having an output device coupled thereto;

(b) a database for storing one or more objects that comprise a graphical image; and (c) an image engine, performed by the computer, for;
  (1) displaying a two-dimensional viewport of the three-dimensional space on the output device;
  (2) moving an object through the two-dimensional viewport of the three-dimensional space according to a position of an input device attached to the computer;
  (3) creating a graphical image of the object using constructive geometric data stored therein, wherein the constructive geometric data identifies at least one constructive system and the constructive system identifies at least one constraint on the processing of the object;
  (4) determining a position of the object within the three-dimensional space relative to the two-dimensional viewport; and
  (5) generating one or more visual cues to indicate the position of the object within the three-dimensional space relative to the two dimensional viewport, wherein the visual cues are temporary and change in appearance as the object is moved within the three-dimensional space.

9. The system of claim 8, wherein the visual cues comprise a trail of indicators showing prior positions of the object within the three-dimensional space relative to the two-dimensional viewport.

10. The system of claim 9, wherein the indicators comprise altered outlines of the object.

11. The system of claim 8, wherein the constructive geometric data identifies a plurality of the constructive systems, and the constructive systems identify a plurality of the constraints on the processing of the object.

12. The system of claim 11, wherein the constructive systems are each comprised of attributes and methods.

13. The system of claim 11, wherein the constructive systems constrain how the objects interact with other objects.

14. The system of claim 13, wherein the constructive systems determine a correct placement of a first object relative to a second object.

15. An article of manufacture embodying logic for providing visual cues for navigating a three-dimensional space represented in a computer-implemented graphics system, the logic comprising:
  (a) displaying a two-dimensional viewport of the three-dimensional space on a monitor attached to the computer;
  (b) moving an object through the two-dimensional viewport of the three-dimensional space according to a position of the input device attached to the computer;
  (c) creating a graphical image of the object using constructive geometric data stored therein, wherein the constructive geometric data identifies at least one constructive system, and the constructive system identifies at least one constraint on the processing of the object;
  (d) determining a position of the object within the three-dimensional space relative to the two-dimensional viewport; and
  (e) generating one or more visual cues to indicate the position of the object within the three-dimensional space relative to the two-dimensional viewport, wherein the visual cues are temporary and change in appearance as the object is moved within the three-dimensional space.

16. The logic of claim 15, wherein the visual cues comprise a trail of indicators showing prior positions of the object within the three-dimensional space relative to the two-dimensional viewport.

17. The logic of claim 16, wherein the indicators comprise altered outlines of the object.

18. The logic of claim 15, wherein the constructive geometric data identifies a plurality of the constructive systems, and the constructive systems identify a plurality of the constraints on the processing of the object.

19. The logic of claim 18, wherein the constructive systems are each comprised of attributes and methods.

20. The logic of claim 18, wherein the constructive systems constrain how the objects interact with other objects.

21. The logic of claim 20, wherein the constructive systems determine a correct placement of a first object relative to a second object.

* * * * *